Aug. 16, 1966    E. F. PETERSON    3,266,102
BODILY ACTUABLE CORE BOX SEAL
Filed April 14, 1964    2 Sheets-Sheet 1

INVENTOR:
Edwin F. Peterson
BY
Eberhard E. Wetley
Atty.

Aug. 16, 1966     E. F. PETERSON     3,266,102
BODILY ACTUABLE CORE BOX SEAL
Filed April 14, 1964     2 Sheets-Sheet 2
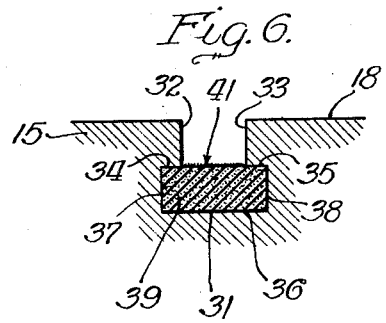
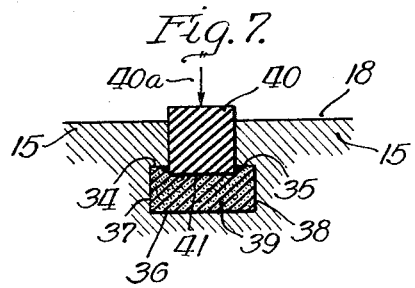
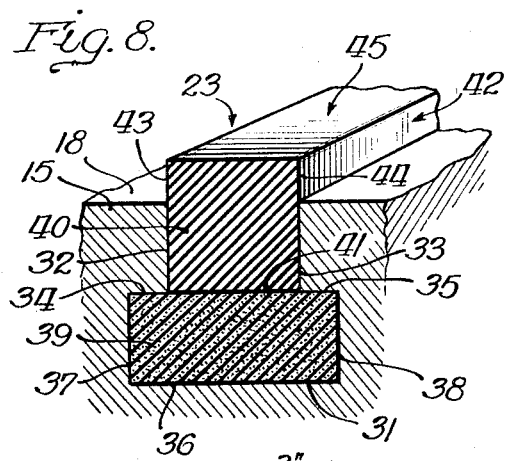
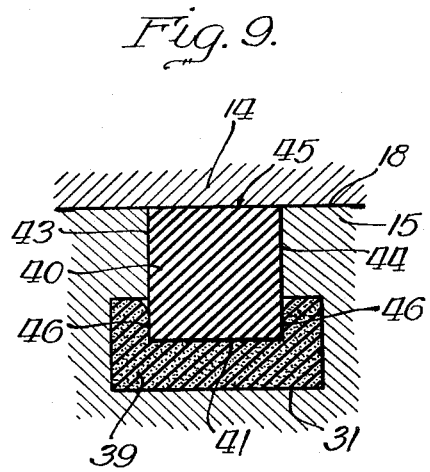
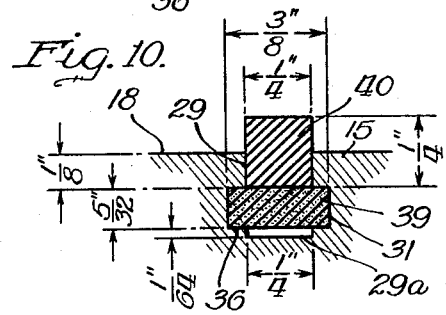
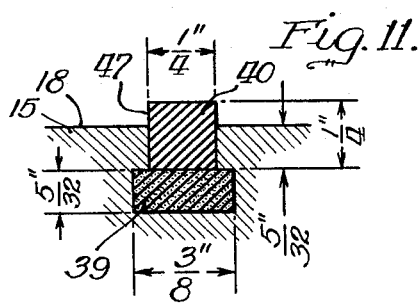
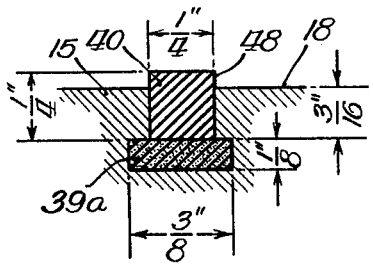
INVENTOR:
Edwin F. Peterson
BY Eberhard E. Wolley
Atty.

United States Patent Office
3,266,102
Patented August 16, 1966

3,266,102
BODILY ACTUABLE CORE BOX SEAL
Edwin F. Peterson, P.O. Box 151, Neponset, Ill.
Filed Apr. 14, 1964, Ser. No. 359,694
12 Claims. (Cl. 22—13)

This invention relates to a sealing instrumentality adapted for counteracting fluid passage between contacting mating surface areas of cooperative separable cavitated units wherein pressure differences are encountered between the hollow interior and ambient exterior regions of the unit assembly.

More specifically, the invention is directed to a core box seal strip which encircles the matching mating surface of one core box section for sealing contact with corresponding related encircling surface area of the other cooperative core box section.

Seals that are held in place by simple adhesions furnished by some sort of bonding agent are typified by my Patents No. 3,074,129 and No. 3,102,309. Seals that are held in place by the use of a swelling agent pushing a portion of the seal into undercuts are disclosed in my Patent No. 3,095,619. Seals that may be held in place by a dovetail cross section are shown in the Rehklau Patent No. 2,510,417. Other types of seals composed wholly of blown or foaming rubber vulcanized and bonded in place in the parting line of an assembly are illustrated in the Olsen Patent No. 2,815,549.

All these seals have certain things in common and each type has certain advantages as well as certain benefits peculiar to that particular type of sealing means and method. They also have certain inherent disadvantages.

The foamed-vulcanized -bonded in situ seal has the advantage of fitting the mate groove perfectly in spite of imperfections in alignment with the receiving groove prepared in the two elements carrying such a seal. The dovetail seal of the Rehklau patent is fitted into a groove that is difficult to prepare and almost impossible to negotiate with a milling cutter in undulating surfaces. In addition, the Rehklau seal is easily dislodged and requires special care in preparing it to negotiate a corner or curved section. The Rehklau seal also dislodges easily when handled carelessly or roughly.

Then with seals fastened into grooves with adhesive, such seals practically depend entirely upon the solvent resistance, heat resistance and strength of the adhesive bond and will, under certain conditions, slowly lose their grip or attachment properties because of deterioration of the glue or adhesive bond line, particularly at or along the exposed edge or edges of the bond disposed between the metal and rubber of the seal. The most sophisticated seal of the character described in my Patent No. 3,095,-619, is expensive to make, requires speedy manipulation during installation and like Rehklau, this type of seal is difficult to carry around an abrupt curve.

It is one of the objects of the present invention to provide a seal strip composed of two cooperative parts of different bodily resilience rendered functionally cooperative for the sealing action and which parts are easily assembled into a predetermined uniform cross sectional groove formed or cut into the surface area of one section of a separable section core box. The two parts employed may be square in cross section, rectangular in cross section, or square and rectangular. The one factor that is important is that one of the component parts considered dimensionally should be made with at least one cross sectional dimension that is greater than the cross sectional dimension of the adjacent joined and bonded face of the other component part. The two part assembled seal is thus T-shaped in its completed installed form.

To prepare the parting line surface of one mating section of a core box for the accommodation of the seal of this invention, a simple T-slot is cut into the box with the use of an appropriate milling cutter or cutters. The slot can be cut into either core box section, but preferably it will be cut into the top surface of the lower section in the form of an inverted T having its crossbar imbedded and its upright leg extending from the crossbar through the surface area of this box section having the slot. The seal is then assembled into the T-slot from the box exterior through the upright or vertical leg part of the T.

It is into the crossbar portion of the T-slot that a tight fitting strip of blown sponge rubber is tucked with a suitable tool such as a dull ended putty knife. This blown rubber strip should be about 18% to 20% larger in cross sectional width than the cross sectional width of the cross bar of the T-slot. This dimensional tightness is employed to assure moisture, oil and dirt exclusion from this lower or inner part of the seal assembly.

By placing this blown rubber part of the seal remotely out of the way into the crossbar depth of the T-slot, this relatively tender portion of the seal is protected from harm and from accidental damage. The blown rubber element provides the reactive cushion needed for the support and orientation of the second element of the seal means and also functions to lock in the assembled two part seal means when the parts are bonded together.

With the blown sponge rubber strip snguly carried in unattached sunken relation within the crossbar of the T-slot, though under internal compression by reason of the narrower crossbar width of the T-slot, a second solid rubber seal strip is now connected with the blown rubber strip. The second strip or element is formed of extruded rubber of limited resilience made from one of the oil proof stocks such as buna-N or neoprene which element is pushed into the upright leg of the T-slot after an appropriate adhesive has been spread upon the exposed buried but upside visible face portion of the foam rubber strip. One appropriate adhesive that furnishes instant bonding of sufficient strength to delaminate the foam rubber even in the event that the solid rubber section is forcibly pulled from the groove or slot is Eastman 910. Thus a compound seal strip is developed through one hidden bonded juncture providing a T-slot retained sealing unit.

It is another object of this invention to provide a T-shaped seal in a T-shaped slot which will provide a predetermined amount of solid rubber exposure outwardly of the leg of the T-slot to perform the sealing function when such exposed rubber strip is contacted by the matching surface area of the mating core box section. And in addition to this selective exposed strip portion, the backup and locking blown rubber strip confined in the crossbar section of the T-slot may be varied in thickness or regulated by initial compression or by both of these methods to cause the solid rubber seal to offer different resistive or reactive forces directed against the matching core box section thus varying the sealing tenacity of the joint between the closed core box parts.

In other words, it is readily possible to establish seals that might be classified in accordance with the pressures that are required to fully compress the seal cap to completely close the two core box sections for the core blowing function. These seals may be termed controlled seals to meet different operative pressures or conditions. For example, a light pressure seal may require 1 to 2 lbs. per linear inch for full closure. A medium pressure seal may require 2 to 3 lbs. effort per lineal inch while a high pressure seal may run from 3 to 5 lbs. per lineal inch for full closure. Some of this controlled action may also be regulated by the amount of exposure of the solid rubber seal portion of the strip since this strip may vary, for example, from about 25% elevated exposure of the rubber seal out of the vertical leg of the T-slot to variable lesser amounts of seal strip exposure out of the upright leg of the slot.

Another object is to make possible a hot box seal by the use of the two part T-shaped bonded seal assembly of the kind hereinbefore discussed. In furfuryl and shell core making, box temperatures can reach 500° F. or more. Some elastomeric synthetic materials are capable of withstanding such elevated temperatures. However, the problem of bonding such rubber like materials to metals and of having the bond lines retain their required holding strength for any period of time has not as yet been mastered. Bond lines in the material itself will fare much better than the metal to elastomer bonds that have been tried.

It will be evident, therefore, that the two cooperative components of the seal of this invention can be made from high temperature resistant elastomers and that the bond line holding them together does not depend upon contact with metal surfaces anywhere. Such materials for high temperature work can be made from silicone rubber for the solid state seal member and from foamed silicone rubber for the spongy cushion portion of the T-shaped seal assembly. And an example of the adhesive for joining the silicone rubber members is the Dow Corning Corporation product available as a room temperature vulcanizing silicone rubber sealant or adhesive. This sealant remains flexible and serviceable over a temperature range of minus 85° F. to 500° F.

As another object, the two piece T-shaped seal assembled within the T-slot by the bonding procedure is what makes it possible to use a T-shaped seal of the character described. If such a T-section of resilient rubber material were made in one piece, it would, first of all, lack the controlled sealing faculties of the dual seal unit of this invention. Furthermore, if such a section were made in one piece, it could not be inserted into a T-slot without damaging the rubber extrusion or requiring that it be preformed in such a way that it will lose its locking ability in the T-slot portion of the core box.

An additional benefit derived from the two component sealing strip resides in the fact that the tender blown rubber is first of all protected against damage and secondly it furnishes the controlled resilience necessary for maintaining perfect sealing contact between the exposed face of the complementary solid seal and the mating surface area of the other matching core box section. The facility of a strip of this type to supply a controlled pressure contact between the seal strip and the adjacent mating face of the matching core box section insures against leakage of fluid or air in either direction whether the cavity of the core box is subjected to vacuum or to pressure.

A still further object is to provide a seal strip with a controlled cushion portion to lock in the assembled strip within the seal strip slot and to construct the cushion portion from a closed cell buna-N sponge rubber or closed cell neoprene sponge rubber. A backup strip of this nature holds its initial resilience and always comes back to its original shape to provide a memory type of material to function in this specific character.

Another object is to establish a two part seal assembled in situ into a T-slot wherein the adhesion area comprising the bond line surfaces of the two joined parts is confined and sunk deeply into the retaining slot to protect and to shield the bonded area, and to also provide a snugly fitted seal element within the vertical leg of the T-slot that is movable within the leg part of the slot, but which also establishes sealing contact with the opposite side walls of the leg portion of the T-slot to further counteract access and infiltration of cleaning fluids and other foreign matter to the bond line region of the T-seal.

All other objects and advantages of the seal of the character herein expressed shall hereinafter appear in or become evident from the following detailed description of the present invention having reference to the accompanying drawings forming a part of this specification.

In the drawings:

FIG. 6 is a further step view in similar section with one portion of the seal in place;

FIG. 7 is another view with the two seal parts assembled and locked into the T-slot;

FIG. 8 is a fragmentary sectional view of the finished seal means as viewed along the line 8—8 in FIG. 2, this view being shown in perspective;

FIG. 9 is a view like FIG. 8, but with the mating core box section engaging the slotted core box section and with the seal means in operative compression;

FIG. 10 is a fragmentary cross sectional view of one arrangement of seal strip providing dimensions for comparative purposes;

FIG. 11 is another view similar to FIG. 10 with dimensions added;

FIG. 12 is a further cross sectional view with dimensions indicated for comparative purposes with the arrangements shown in FIGS. 10 and 11.

It is to be understood that the seal of this invention may be carried by either core box section for sealing contact with the mating core box section. For purposes of description and for consistent explanation, the sealing means will be referred to as associated with the lower core box section requiring an inverted T-slot in that box part. Furthermore, this type of a seal need not be restricted to core boxes, but is also readily adaptable for use between any two matching surface areas of doors, windows, covers on containers, or between any surface areas needing a seal means therebetween to counteract fluid passage between the regions divided by and separated by such a seal means.

Figure 1:
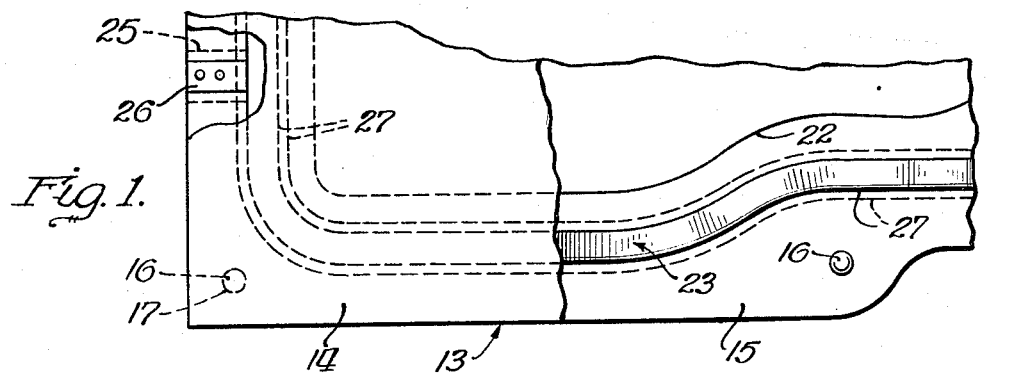
FIG. 1 is a fragmentary plan view of an assembled core box, with portions of the top section broken away, and having the seal strip of this invention employed between matching surface areas of the box sections.
Figure 2:
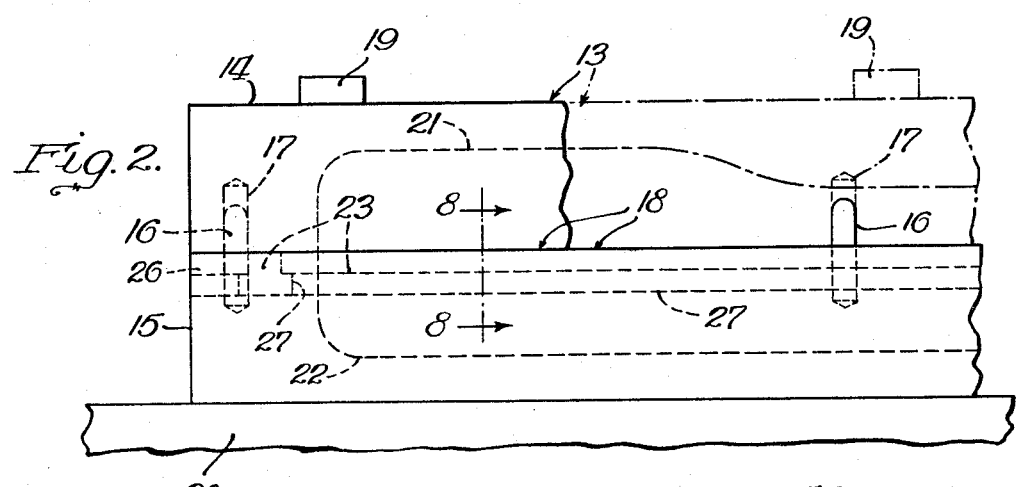
FIG. 2 is a side elevational view of the core box seal strip portion shown in FIG. 1.
Figure 3:
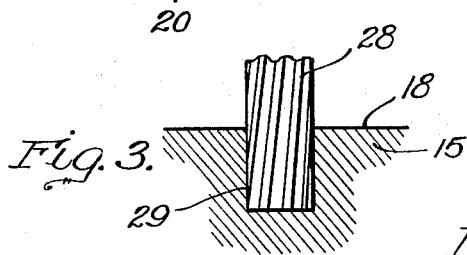
FIG. 3 shows a sectional view of a portion of the lower core box section with a cutter forming one portion of the seal strip slot.
Figure 4:
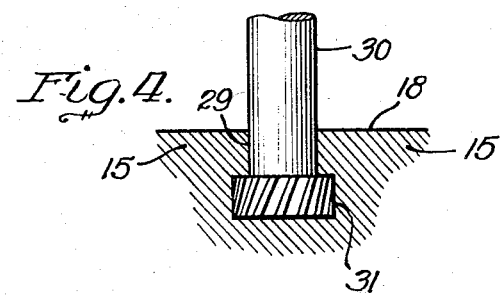
FIG. 4 is another sectional view as FIG. 3 with another cutter forming the T-slot for the seal.

FIGS. 1 and 2 illustrate a two part core box 13 having a top section 14, bottom section 15, oriented by means of suitable pins 16 in holes 17 and being in metal to metal contact along a parting line 18 and so held by any suitable clamp members 19 connecting the core box sections or connected with a base member or core box table 20. Sections 14 and 15 enclose complementary core cavity sections 21 and 22 and the seal means 23 of the present invention is associated with box section 15 and surrounds the core box cavity to provide a fluid seal between the inner cavity area of the box and the exterior ambient region about this core box.

The composite seal 23 requires a continuous chamber in the form of a T-slot for its attachment and connection with the core box section 15. Such a slot or groove may be cut into the metal by means of one or more milling cutters or by a special cutting tool having the ability to cut the T-slot in one pass about the core box periphery. The slot may be started by a lateral entry of the tool or tools into the box edge as at 25 from which point the tool can then be made to follow the box contour. A T-shaped plug 26 fitted into the entry slot and pinned in place will then close off any further access to the seal holding T-slot 27 in section 15 of the core box.

Figure 5:
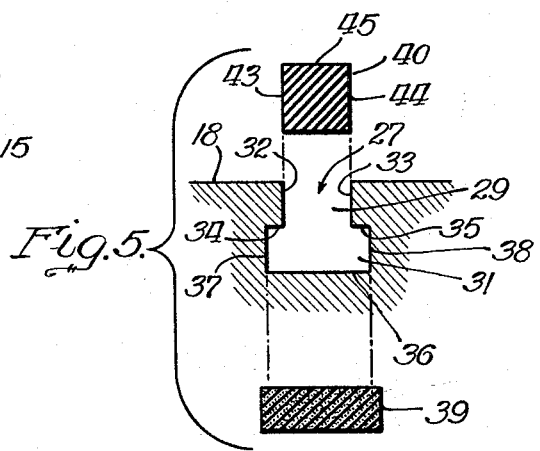
FIG. 5 illustrates, in the transverse vertical section, a disassembled view of the core box with the T-slot and the complementary parts of the seal.

One method of forming slot 27 is to use an end mill 28 to cut the vertical groove 29 about the core box 15 followed by a Woodruff type cutter 30 guided in the first groove to then form the cross bar 31 of the finished T-slot as seen in FIG. 5.

The completed inverted T-slot 27 now has a vertical or upright leg 29 communicating between the parting line surface 18 and the cross bar 31 lying remotely beneath the surface 18 and symmetrically with respect to the leg 29. This finished slot 27 comprises spaced vertical and parallel guide walls 32 and 33, under cut wall ledges 34 and 35 with a vertically spaced bottom wall 36, the latter three being parallel to the parting surface 18, and spaced vertical parallel cross bar end walls 37 and 38 that complete the slot contour as illustrated in FIG. 5.

As also shown in FIG. 5, the seal means or strip 23 comprises a reactionary cushion 39 and a seal 40. The reactionary cushion and seal are made from resilient materials having different degrees of resilience. Cushion 39 is preferably made from a cellular silicone sponge rubber material or from closed cell buna-N sponge or neoprene sponge material providing good resilience and good memory characteristics to return to their original shapes after compression or deformation. The seal 40 is made from materials having more limited resilience and one such material is a solid silicone rubber.

In assembling the seal means 23, the cushion 39, which is about 18% to 20% wider than cross slot 31, is inserted into the cross bar slot 31 with a dull putty knife or wooden spatula or the like as shown in FIG. 6. The cushion 39 thus fills the cross bar slot 31 tightly adhering to the adjacent wall areas contacted by the resilient cushion which is now under compression between the walls 37 and 38 of the slot. This cushion member 39 is also locked in under the ledges 34 and 35 while seated on the bottom wall 36.

An adhesive bonding material 41 is then applied to the exposed part of the cushion 39 through slot leg 29 and seal 40 is guided into slot leg 29 into surface contact with the bonding material and cushion 39 as shown in FIG. 7 to effect the union between these two resilient elements within the T-slot 27. The arrow 40a in FIG. 7 indicates that slight downward pressure is applied to the top surface of seal 40 to move the bond line adhesive material 41 down and away from ledges 34 and 35 to effect a good contact between elements 39 and 40. One bond that may be used is a Dow Corning Corporation 30-121 product with a room temperature vulcanizing action and which is capable of withstanding a temperature range of from minus 85° F. to 500° F. Another adhesive for this purpose is the Eastman 910 bonding adhesive manufactured under one or more of the following United States patents: 2,721,858; 2,748,050; 2,756,251; 2,763,585; 2,763,677; 2,765,332; 2,768,109; 2,776,232; 2,784,127; 2,784,215; 2,794,788 and 2,816,093.

Thus the seal means 23 is now assembled within the T-slot 27 with a cushion 39 firmly bonded to an extruded seal 40 to provide a combined T-shaped seal unit. It should be noted that the bond line junction of the complementary seal parts is shielded deeply within the T-slot 27 and that no peripheral part of the seal 23 is bonded to or fastened to any portion of the metal walls lining the inverted T-slot.

The cushion element 39 supports and orients the seal 40 as shown in FIG. 8 with portion 42 of seal 40 elevated and exposed above the parting line surface 18. The cushion element 39 is also locked in the cross bar slot 31 under the retaining ledges or walls 34 and 35 to thereby hold seal 40 in its designed operative relation with respect to the slot leg 29. Attention is also directed to the fact that seal 40 is polygonal in shape and that it is formed with two parallel outer walls 43 and 44 that slidably engage the walls 32 and 33 of slot leg 29 for both vertical movement when the seal face 45 of the seal 40 is contacted by core box section 14 and to also act as a means to seal off the slot 29 walls and mouth as well as the interior portion of the T-slot 27. This further protects the bond line and adhesive material 41 from attack by cleaning fluids or other solvents used in shops handling core boxes of the kind herein described.

Actually, seal 40, therefore, presents three active seal surfaces or areas as represented by the top face 45 which engages or seats against the overhead box section 14 and two other surface areas which are the opposite outer walls 43 and 44 that ride along and in sliding contact with the surface walls 32 and 33 of the slot leg 29 to sealwise confine the cushion 39 in the cross bar 31 and to protectively confine the bond line juncture of the sealing means.

When the seal unit 23 is actively situated in sealing position as in FIG. 9, the surface 45 of the seal is disposed in the plane of the parting line 18 and the locking cushion 39 is deformed but pressurized so as to exert a predetermined upward thrust against the seal 40. In this relation, the assembled seal means shows that seal 40 is fully bodily depressed or moved through leg slot 29 with the normal excess elevated seal portion 42 located inwardly of slot 29 and with the excess seal height portion 46 absorbed into cross bar slot 31 and into the cushion piece 39. Upon the removal of core box section 14, cushion 39 resumes its normal shape as shown in FIG. 8 and seal 40 is reestablished into the projected position noted in FIG. 8.

This seal arrangement is such that little tension is experienced at the bond material line 41 because under normal operative conditions the bond area is only subjected to compression by seal 40 as will be evident from the illustrations in FIGS. 8 and 9.

It is to be understood that the seal will have to be pieced end to end at some location along the seal slot 27. This can be readily accomplished by first cutting the cushion piece for end to end contact during insertion into cross bar slot 31 and applying some of the adhesive material to one or both ends before the final insertion of those cushion 39 ends. Then, when inserting seal 40, this may also be readily cut to length and adhesive applied to one or both ends before pushing these ends into slot 29 against adhesive 41 and the cushion unit. Obviously, the two end seal portions of cushion 39 and seal 40 should be staggered or spaced lengthwise of the seal assembly to keep the vertical end seals of these parts out of line.

The seal arrangement of this construction lends itself to variable controlled pressure structures to meet different operative conditions. Certain relationships of variable pressure seals are shown in FIGS. 10, 11 and 12 of which FIG. 11 is the seal means shown in FIGS. 8 and 9.

FIG. 10 places the cross bar slot 31 one-fourth of an inch below the parting line 18 and slot 29 has an extended recessed portion 29a disposed below the bottom surface 36 of slot 31 and under the cushion 39. This type of seal places the seal 40 about one-half in and one-half out of slot 29 and is of the light pressure kind providing about 1 to 2 lbs. reaction per lineal inch of seal during fully closed core box conditions.

The seal of FIG. 11 is the average type as hereinbefore described wherein recess 29a is omitted and seal 40 has a less exposed lineal portion 47 as may be noted from the dimensions shown. This type of seal provides about 2 to 3 lbs. reaction per lineal inch under fully closed core box conditions.

In the comparative seal structure illustrated in FIG. 12, the vertical height or thickness of the cushion 39a is reduced and seal 40 is still deeper within slot 29 to expose a smaller portion 48 above the parting line 18. This particular dimensional arrangement provides a reactive seal pressure of about 3 to 5 lbs. per lineal inch of seal when the mating core box sections are fully closed.

Seal 40 is of limited resilience rubber material, but under pressure conditions some lateral expansion can take place to enhance the sealing fit of the lateral outer walls 43 and 44 of the seal toward the walls 32 and 33 of slot 29 while still permitting bodily movement vertically of slot 29. Any possible fluid leakage, will in any case, have to make its way about the tortuous outline of the entire T-shaped seal before it can find its way from one side to the other of the seal of this invention. This is highly improbable.

The foregoing description has been directed to a preferred seal construction. Certain modifications and changes are deemed possible and contemplated without departure from the fundamental concept of this invention. The extent of such modifications shall, however, be governed by the breadth and scope of the language in the following claims directed to the sealing means of the present invention.

What I claim is:

1. A core box sealing means carried in the parting line surface area of one core box section for sealing contact with a complementary surface area of a mating core box section comprising a seal confining chamber in said one core box section having an upright entry slot and a cross slot imbedded within said section, said entry slot providing communication between said parting line surface area and said cross slot, a sponge rubber cushion nested in said cross slot, a solid rubber seal connected with said cushion and slidably guided within said upright entry slot, said cushion providing a retaining means for said seal and functioning to orient said connected seal within said upright slot in a normal inoperative position with a portion of said seal projecting outwardly above said parting line surface area to a predetermined elevated position.

2. A core box sealing means as in claim 1, wherein said sponge rubber cushion is constructed from readily compressed blown porous cellular sponge rubber of the memory type that repeatedly returns to its original shape after compression, and said solid rubber seal is constructed from densely formed rubber material having comparatively limited resiliency.

3. A core box sealing means as in claim 1, wherein said sponge rubber cushion and said solid rubber seal are provided with abutting coplanar surfaces located deeply within said seal confining chamber remotely spaced inwardly from said parting line surface area, and adhesive bonding means securely joins said cushion and seal parts of the sealing means along a bond line surface coincident with said abutting coplanar surfaces along their remote and shielded location within the seal confining chamber.

4. A core box sealing means as in claim 2, wherein an adhesive material comprises the securing means to join said sponge rubber cushion with said solid rubber seal.

5. A core box sealing means for a parting line surface area of a core box section comprising a rubber seal strip, a rubber cushion strip and an inverted T-slot formed into the parting line surface area of said core box section, said T-slot of said section comprising an upright leg as the slot entry space and a cross bar slot at the inward terminal end of said leg, said rubber seal strip being movably carried in said upright slot leg, said rubber cushion strip being wholly confined within said cross bar slot and providing a reference surface to engage and to normally support said rubber seal strip in a given vertical relation within said upright slot leg with a portion of said seal strip projecting out of said slot to a position above the parting line surface of said core box section, said seal strip being vertically actuable within said leg slot and depressible into said cushion strip when engaged by a mating core box section to align said seal strip top with the parting line area of said box sections and to induce reactionary pressure by said cushion strip, to force said seal strip against said mating core box section.

6. In the core box sealing means of claim 5, with the addition of an adhesive to bond said seal strip to said cushion strip along a bond line area disposed deeply within said T-slot and out of contact with any portion of the exterior of said core box section carrying said sealing means.

7. In the core box sealing means of claim 5, wherein said cross bar slot terminates laterally beyond each side of said upright leg slot to form spaced coplanar ledges flanking said leg slot, said cushion strip is locked into said cross bar slot under said ledges to orient said reference surface on said cushion in a predetermined position for the normal support of said seal strip, and an adhesive bond material joins said seal strip to the reference surface of said cushion.

8. In the combination of claim 7, wherein said cushion strip is provided with a width greater than the width of said cross bar slot to induce a prestressed compression into said cushion strip to hold said strip reference surface in line with said slot ledges and to augment the reshaping of said cushion after deformation.

9. A core box seal means comprising, in combination, mating core box sections have coincident core box parting line surfaces, at least one of said sections providing a cavitated core box section having a parting line surface area surrounding said cavity, a continuous slot in said surface area of said one section extending about the box periphery dividing said parting line surface area about said core box cavity, a bodily movable seal member disposed within said slot for complete bodily displacement in directions either inwardly or outwardly with respect to said slot and in relation to said parting line surface area of the core box section having said slot and with said seal member normally exposed and projecting above said parting line surface area when said core box sections are separated, and resilient means connected with said seal member to normally hold said member in said given exposed position outwardly of said slot in said one section to a point above the parting line surface of said one section in a position to forcibly react against the parting line surface of the other mating core box section during the closure action and seating of said other core box section when said member is then bodily moved into said slot by means of said other mating core box section whereby said member maintains a sealing contact with said other seated closure section.

10. A core box seal means as in claim 9, wherein said one core box section includes a continuous cavity underlying said continuous slot and said resilient means is locked into said cavity against displacement.

11. A core box seal means as in claim 10, wherein said resilient means is a sponge rubber cushion and adhesive bond material secures said cushion to said seal member.

12. A core box seal means of the character set forth and defined in claim 11, with the addition of a recess below the location of said sponge rubber cushion and communicating with said cushion holding cavity to permit partial bodily displacement of said cushion under the compressive engagement of said cushion by said seal member.

References Cited by the Examiner

UNITED STATES PATENTS

| | | | |
|---|---|---|---|
| 2,081,040 | 5/1937 | King. | |
| 2,510,417 | 6/1950 | Rehklau | 22—13 |
| 2,941,824 | 6/1960 | Hoyer | 277—227 |
| 2,951,721 | 9/1960 | Asp | 277—233 |

J. SPENCER OVERHOLSER, *Primary Examiner.*

MARCUS U. LYONS, *Examiner.*